No. 655,725. Patented Aug. 14, 1900.
L. C. MUMFORD.
CORK EXTRACTOR.
(Application filed Dec. 20, 1899.)
(No Model.)
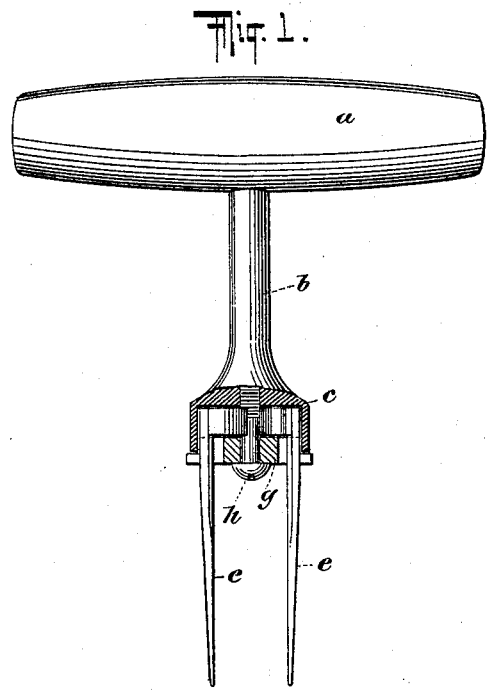
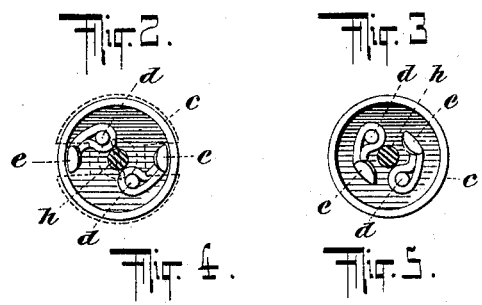
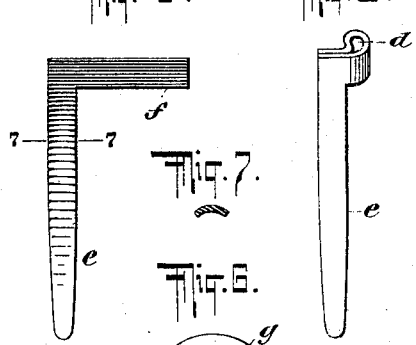
WITNESSES:
INVENTOR
Lucian C. Mumford
BY Briesen & Knauth
ATTORNEY

UNITED STATES PATENT OFFICE.

LUCIAN C. MUMFORD, OF NEW YORK, N. Y., ASSIGNOR OF ONE-HALF TO GERARD CRANE, OF SAME PLACE, AND JAMES MARSHALL, OF SOMERS, NEW YORK.

CORK-EXTRACTOR.

SPECIFICATION forming part of Letters Patent No. 655,725, dated August 14, 1900.

Application filed December 20, 1899. Serial No. 740,959. (No model.)

*To all whom it may concern:*

Be it known that I, LUCIAN C. MUMFORD, residing in the city, county, and State of New York, have invented certain new and useful Improvements in Cork-Extractors, of which the following is a specification.

My invention relates to cork-extractors, and has for its object to improve the Mumford type of cork-extractor.

In the accompanying drawings I have shown, by way of illustration and without intending to limit myself thereto, a cork-extractor in which my invention is embodied.

In the drawings, Figure 1 is a sectional side elevation of a cork-extractor. Fig. 2 is a front or face view with the cam-plate in dotted lines, showing the prongs swung wide apart. Fig. 3 is a similar view with the cam-plate omitted, showing the prongs close together. Fig. 4 shows the blank from which the prongs are preferably made, and Fig. 5 shows the prong bent up into form. In Fig. 6 I have shown the cam-plate, and in Fig. 7 a section on line 7 7 of Fig. 4.

Before specifically describing the form of my invention shown in the drawings I would have it understood that I do not mean to thereby limit myself to what is shown, but would have it understood that the structure shown in the drawings is illustrative merely and that the structure may be departed from without departing from the spirit of my invention or the meaning of the claims.

In the drawings, *a* is the handpiece of the cork-extractor. *b* is the shank thereof, which shank is shown in the present instance as terminating in a cup *c*. The shank and handpiece constitute a handle. The cup *c* is shown as provided with a pair of pivots or pins *d*, over which fit the bases of the prongs *e*. Turning for a moment to Figs. 4 and 5, the preferred mode of constructing these prongs will be found illustrated. In these figures the prong is shown as consisting of an angular base of sheet metal, one of whose legs or arms *f* is bent up laterally of the length of the prong into a loop form, as shown in Fig. 5, to constitute a base for the prong, which base fits over the axes, pivots, or pins *d*, which extend longitudinally of the prongs. The cup receives a cam-plate, shown in the present instance as a centrally-apertured cam-plate or prong-adjusting means *g*, seated in the cup and having an edge projecting slightly beyond the circumference of the cup and provided with slots placed angularly with respect to the radii of the plate. The cam-plate *g* serves to retain the prongs in place in the cup and to effect the adjustment of the prongs on their pivots. The screw or rivet *h* is employed to hold the cam-plate in place on the cup, and when desired this screw may be screwed in so firmly as to retain the cam-plate rigidly in a given position, and thereby maintain the prongs adjusted in a predetermined fixed position. As before stated, in Fig. 3 I have shown the prongs close together and in Fig. 2 spread wide apart. This may be effected by moving the cam-plate or otherwise providing for the swing or bodily movement of the prongs on their pivots.

The mode of operation and use of the structure will be obvious from the drawings.

It is obvious that it is not necessary that both prongs be movable, as one of the said prongs may be fixed and the other movable.

Having described my invention, what I claim, and desire to secure by Letters Patent, is—

1. In a cork-extractor, the combination of a suitable handle, a plurality of substantially-parallel cork-extracting prongs adapted to engage a cork, one of the said prongs being pivotally carried by the said handle and a rotary prong-adjusting means for laterally moving said prong bodily to cause the same to swing.

2. In a cork-extractor, the combination of a cupped handle, a plurality of cork-engaging prongs pivoted in the cup and cam means carried by the handle and engaging the prongs.

3. In a cork-extractor, the combination of a cupped handle, a plurality of cork-engaging prongs pivoted in the cup and a cam-plate *g* pivotally connected to the handle, and adapted to engage the prongs.

4. In a cork-extractor, the combination of a handle, a plurality of prongs carried thereby, one of the said prongs being pivoted to the said handle by a pivot extending longitudinally of the prong, whereby the said prong may be swung on the said pivot toward or from the other prong to accommodate the said prongs to wider or narrower corks.

5. In a cork-extractor, the combination of a handle, a plurality of prongs carried thereby one of the said prongs being provided with a lateral extension, the said prong being pivoted by the said lateral extension to the handle by a pin extending longitudinally of the prong.

6. In a cork-extractor, the combination of a plurality of prongs pivoted to a handle by pivots extending longitudinally of the said prongs and adjusting means for swinging the said prongs on their pivots to adjust the same toward or from each other to accommodate corks of different diameters.

7. In a cork-extractor, the combination of a handle and a plurality of prongs, one of the said prongs being axially pivoted to the said handle on an axis extending longitudinally of the said prong, and adjusting means for swinging the said prong to adjust the same toward and from the other prong.

8. In a cork-extractor, the combination of a handle, a plurality of prongs axially pivoted thereto on axes extending longitudinally of the said prongs and a swinging plate for swinging the said prong to adjust them toward or from each other, substantially as described.

9. In a cork-extractor, the combination of a handle, a plurality of substantially-parallel prongs carried thereby, one of the said prongs being secured to said handle by a swinging connection so as to swing on an axis extending longitudinally of said prong to permit the said prong to be bodily moved laterally to maintain substantial parallelism between the prongs.

10. In a cork-extractor, the combination of a handle cork-grasping prongs retained within said handle and a centrally-pivoted slotted plate adapted to cause said prongs to approach and recede from each other, substantially as described.

LUCIAN C. MUMFORD.

Witnesses:
JAMES MARSHALL,
GERARD CRANE,
HENRY M. GURK.